US006563461B1

(12) United States Patent
Elgersma et al.

(10) Patent No.: US 6,563,461 B1
(45) Date of Patent: May 13, 2003

(54) SYSTEM, METHOD, AND SOFTWARE FOR NON-ITERATIVE POSITION ESTIMATION USING RANGE MEASUREMENTS

(75) Inventors: Michael R. Elgersma, Plymouth, MN (US); Blaise G. Morton, Wheeling, IL (US)

(73) Assignee: Honeywell International Inc., Morristown, NJ (US)

( * ) Notice: Subject to any disclaimer, the term of this patent is extended or adjusted under 35 U.S.C. 154(b) by 108 days.

(21) Appl. No.: 09/640,129

(22) Filed: Aug. 16, 2000

(51) Int. Cl.$^7$ ............................. G01S 3/02; H04B 7/185
(52) U.S. Cl. .................................. 342/458; 342/357.12
(58) Field of Search ....................... 342/357.06, 357.12, 342/458; 701/213

(56) References Cited

U.S. PATENT DOCUMENTS

| | | | |
|---|---|---|---|
| 5,740,048 A | 4/1998 | Abel et al. .................. | 364/443 |
| 5,914,686 A | 6/1999 | Schipper | |
| 5,986,603 A | * 11/1999 | Schipper ..................... | 701/213 |

OTHER PUBLICATIONS

MATLAB Worksheet for 09/640,129.*
Abel, J.S., et al., "Existence and Uniqueness of GPS Solutions", *IEEE Transactions on Aerospace And Electronic Systems, 27* (6), pp. 952–956, (Nov. 1991).
Bancroft, S., "An Algebraic Solution of the GPS Equations", *IEEE Transactions on Aerospace and Electronic Systems, AES–21* (7), pp. 56–59, (Jan. 1985).
Biton, I., et al., "Direct Solution of the GPS Equations", *The 9th International Technical Meeting of The Satellite Division of the Institute of Navigation, ION GPS–96, Part 2 of 2*, Kansas City Convention Center, Kansas City, Missouri, pp. 1313–1320, (1996).

(List continued on next page.)

*Primary Examiner*—Thomas H. Tarcza
*Assistant Examiner*—Fred H Mull (57) ABSTRACT

The typical global positioning system (GPS) estimates the three-dimensional, global position of a radio receiver and associated vehicle, such as an aircraft, using the range measurements between the radio receiver and a set of earth-orbiting satellite transmitters. Estimating the position of the receiver from these range measurements generally entails using an iterative calculation process, which computes a series of position estimates, with each successive estimate converging with increasing accuracy toward the actual receiver position. This iterative approach, however, is not only time consuming, but sometimes fails to converge toward the actual receiver position. Though others have tried to solve these problems, their approaches either fail to consistently converge on a single solution or give multiple solutions. Accordingly, the inventors devised, among other things, new non-iterative methods, for using range measurements to estimate position. One exemplary position-estimation method entails receiving a set of two or more range measurements; defining an error function based on the set of range measurements, with the error function having only one local minimum; and then determining a position estimate based the one local minimum of the error function. This and other exemplary embodiments of the invention promise to reduce the time for computing position estimates.

31 Claims, 3 Drawing Sheets

OTHER PUBLICATIONS

Chaffee, J., et al., "GPS Positioning, Filtering, And Integration", *IEEE National Aerospace and Electronics Conference, NAECON*, Held at the Dayton Convention Center, pp. 327–332, (1993).

Chaffee, J., et al., "On the Exact Solutions of Pseudorange Equations", *IEEE Transactions on Aerospace and Electronic Systems*, 30 (4), pp. 1021–1030, (Oct. 1994).

Chaffee, J.W., et al., "Bifurcation of Pseudorange Equations", *Proceedings of the National Technical Meeting*, pp. 203–211, (1993).

Chaffee, J.W., et al., "The GPS Filtering Problem", *IEEE*, pp. 12–20, (1992).

Hoshen, J., "The GPS Equations and the Problem of Apollonius", *IEEE Transactions on Aerospace and Electronic Systems*, 32 (3), pp. 1116–1124, (Jul. 1996).

Krause, L.O., "A Direct Solution to GPS–Type Navigation Equations", *IEEE Transactions on Aerospace And Electronic Systems*, AES–23 (2), pp. 225–232, (Mar. 1987).

Rudel, M., et al., "GPS Relative Accuracy for Collision Avoidance", *Proceedings of the National Technical Meeting*, pp. 971–977, (1997).

Elgersma M: "Initial Solution of Pseudo–Range Equations" Workshop Mathematical Challenges in Global Positioning Systems (GPS), Aug. 16–18, 2002, Institute for Mathematics and Its Applications (IMA), University of Minnesota, Online! XP002196393 Retrieved from the Internet: URL:http://www.ima.umn.edu/gps/abstract/elgersma1.html retrieved on Apr. 15, 2000! Abstract.

Leva J L: "An Alternative Closed–Form Solution to the GPS Pseudo–Range Equations" IEEE Transactions on Aerospace and Electronic Systems, IEEE Inc., New York, US, vol. 32, No. 4, Oct. 1, 1996, pp. 1430–1439, XP000688912, ISSN: 0018–9251 Section "Introduction".

* cited by examiner

SYSTEM, METHOD, AND SOFTWARE FOR NON-ITERATIVE POSITION ESTIMATION USING RANGE MEASUREMENTS

TECHNICAL FIELD

The present invention concerns position-measurement systems and methods, particularly methods of using range measurements to estimate position.

BACKGROUND OF THE INVENTION

Some position measurement systems use radio signals broadcast from transmitters to measure the position of a radio receiver that receives the radio signals. A seminal example of one such system is a global positioning system.

The typical global positioning system (GPS) measures the three-dimensional, global position of a radio receiver. The receiver, sometimes mounted to a vehicle such as an automobile or aircraft, receives signals from a set of earth-orbiting satellite transmitters. Each signal indicates not only the position of its transmitter but also its is transmission time, enabling the receiver to approximate signal transit times and to estimate or measure the distances to the transmitters. A processor coupled to the receiver uses at least four of these measured distances, known as range measurements, to approximate or estimate the position of the receiver and the associated vehicle.

Estimating the position of the receiver from the range measurements generally entails solving a set of nonlinear range equations using an iterative calculation process. The iterative process entails starting with an initial position estimate, computing a second estimate using the initial estimate, computing a third estimate using the second estimate, and so on, with each successive estimate being better than the previous one and thus converging toward the actual receiver position. This process continues until the change between successive position estimates become insignificantly small.

Unfortunately, this iterative process is not only time consuming, but often fails to converge toward the actual receiver position when the receiver is not between the earth and the earth-orbiting satellite transmitters. Thus, for example, vehicles traveling in space outside the constellation of satellite transmitters cannot rely on a global positioning system for navigation.

In trying to solve these problems, others have sought to develop non-iterative, or closed-form, solutions to the range equations. See, for example, Bancroft and Chaffee, "An Algebraic Solution of the GPS Equation," IEEE Trans on Aerospace and Elect Systems, January 1985. However, this and other approaches have not been entirely acceptable, because they either fail to consistently converge on a single solution or give multiple solutions to the pseudorange equations, and thus require further analysis to pick the right one.

Accordingly, there remains a need for better ways of estimating position from range measurements.

SUMMARY OF THE INVENTION

To address this and other problems, the inventors devised new methods as well as systems and software embodying these methods, for using range measurements to estimate position. One exemplary method entails receiving a set of two or more range measurements; defining an error function based on the set of range measurements, with the error function having only one local minimum; and then determining a position estimate based the one local minimum of the error function. Other embodiments use this position estimate as an initial position estimate in an iterative process, such as Kalman filtering, to promote its rapid and consistent convergence to an appropriate position solution.

One exemplary application for this and other embodiments of the invention is GPS-based position estimation for spacecraft outside a GPS satellite constellation. Other applications include position estimation of cellular phones outside a triangle of three base towers, and in distributed robotic systems, position estimation of scout robots outside a triangle of three ranger robots.

DETAILED DESCRIPTION OF THE PREFERRED EMBODIMENTS

Figure 1:
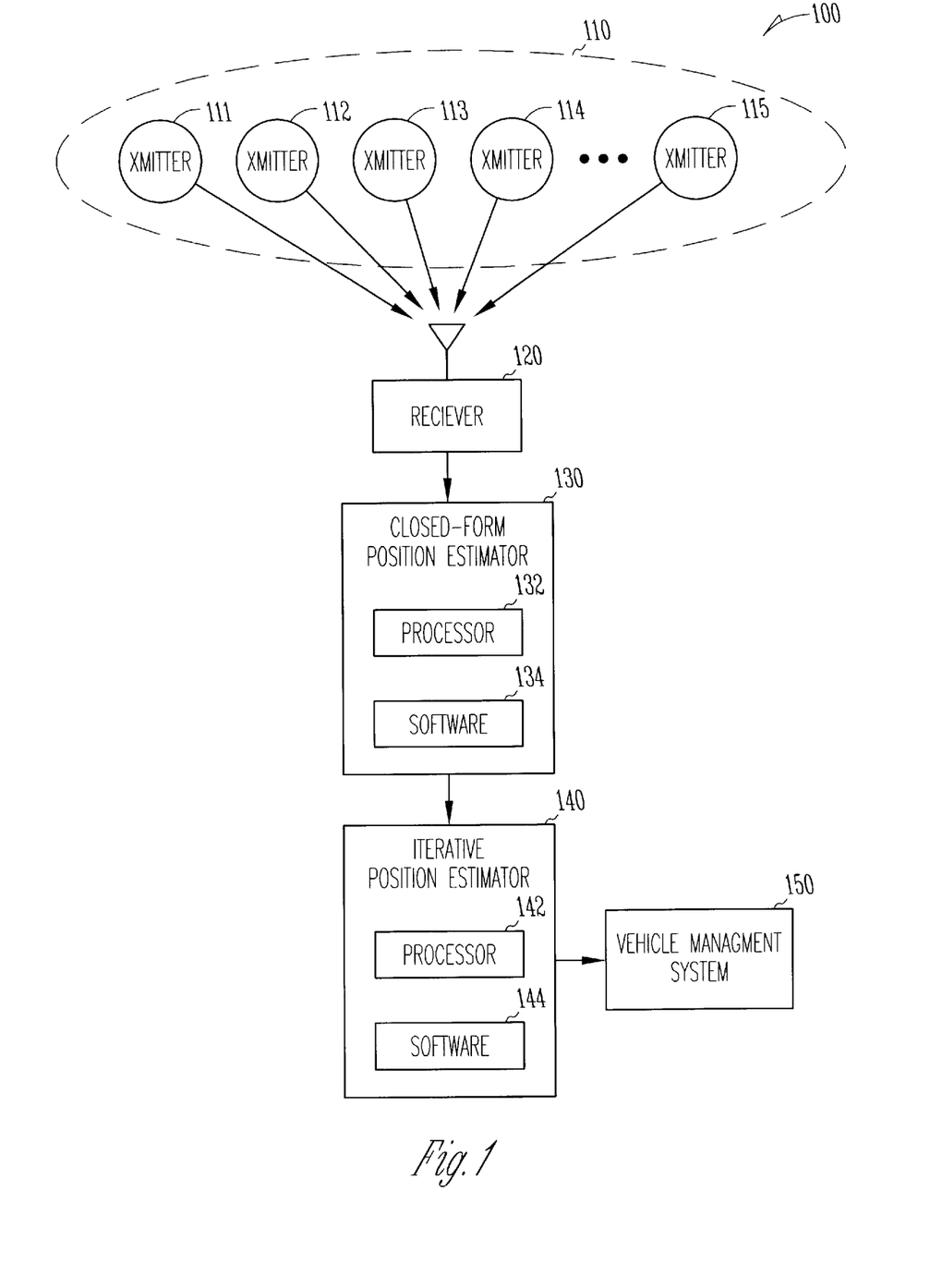
FIG. 1 is a block diagram of a first exemplary navigation and guidance system 100 incorporating the present invention.
Figure 2:
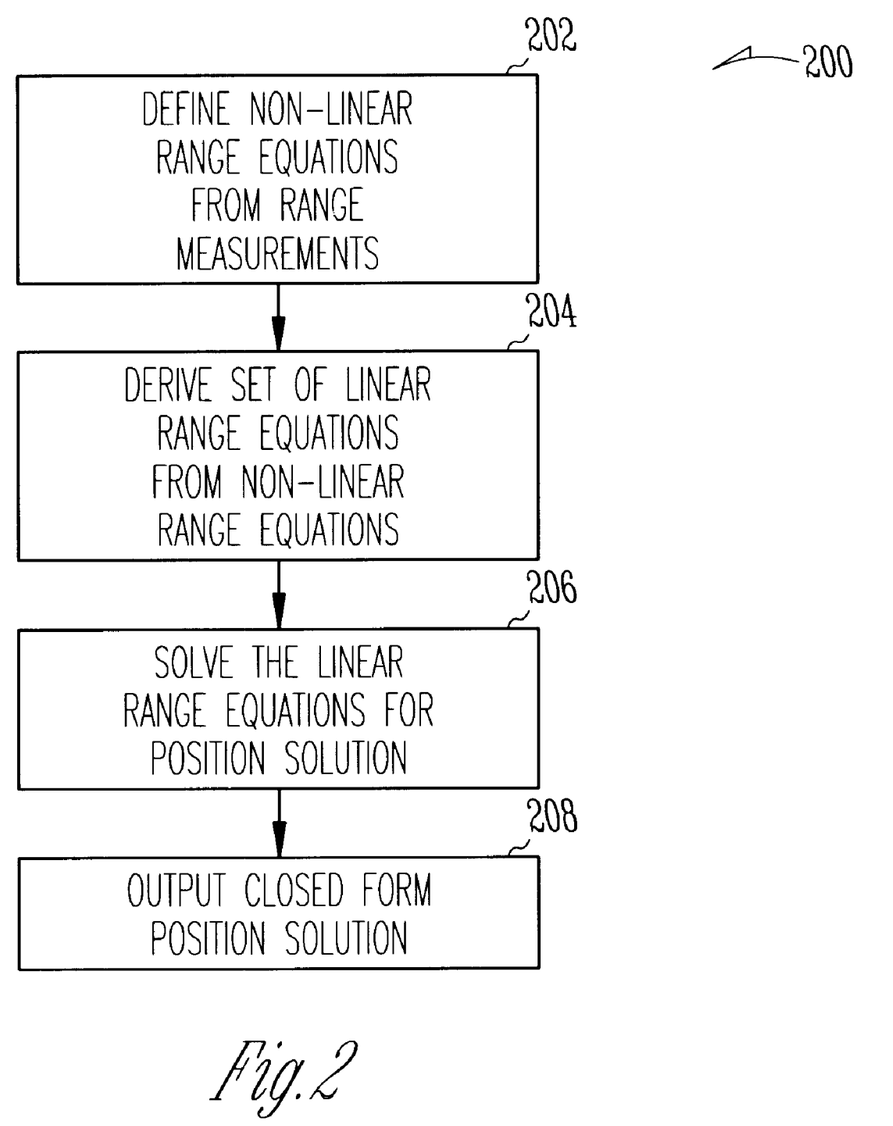
FIG. 2 is a flow chart illustrating a first exemplary method of operating the system of FIG. 1 according to the present invention.
Figure 3:
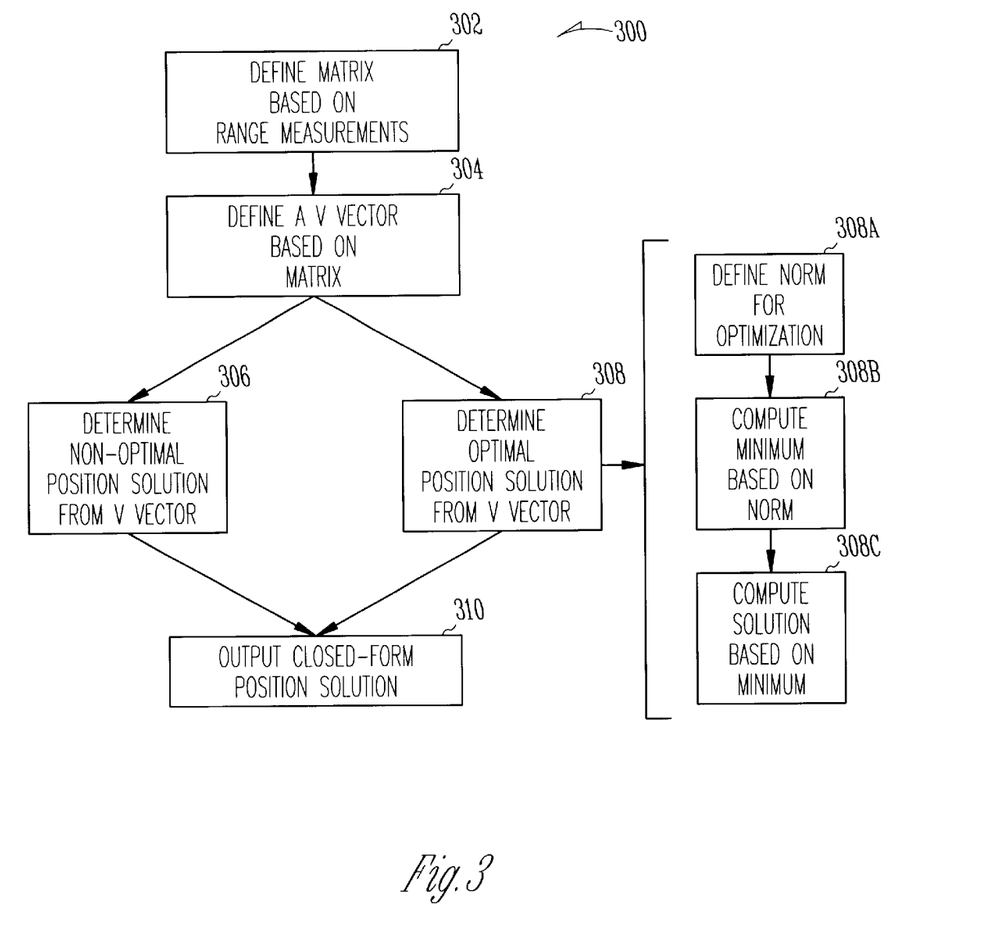
FIG. 3 is a flow chart showing a second exemplary method of operating the system of FIG. 1 according to the present invention.

The following detailed description, which references and incorporates FIGS. 1–3, describes and illustrates specific embodiments of the invention. These embodiments, offered not to limit but only to exemplify and teach the concepts of the invention, are shown and described in sufficient detail to enable those skilled in the art to implement or practice the invention. Thus, where appropriate to avoid obscuring the invention, the description may omit certain information known to those of skill in the art.

Exemplary System Incorporating Invention

FIG. 1 shows an exemplary vehicle navigation system 100 incorporating the present invention. System 100 includes a transmitter system 110, a receiver 120, a closed-form position estimator 130, an iterative position estimator 140, and a vehicle control system 150.

Transmitter system 110 includes a number, m, of transmitters, of which transmitters 111, 112, 113, 114, and 115 are representative. In the exemplary embodiment, the m transmitters are a subset of the NAVSTAR GPS constellation of satellite transmitters. However, in other embodiments, the transmitters are incorporated in mobile robots or terrestrial communication towers. In the exemplary embodiment, each transmitter broadcasts a respective signal indicating its respective transmitter positions and signal transmission times to receiver 120. (Some embodiments include a transmitter identification code, instead of transmitter position., that facilitates determination of transmitter position using a look-up table.)

Receiver 120, mounted to or carried by a vehicle (not shown), such as a landcraft, watercraft, aircraft, or spacecraft (not shown), receives the signals, extracts position and time data, and computes a set of m range measurements, generally one range measurement for each received transmitter signal. In the exemplary embodiment, receiver 120 is NAVSTAR GPS compatible receiver which computes pseudoranges, that is, range measurements and receiver clock offsets for the signals. (As used herein, the term "range measurements" includes pseudorange measurements.) However, in other embodiment the receiver is part of a wireless communications devices, such as a cellular telephone or personal digital assistant, or is part of a ranger or scout in a distributed robotics system. In any case, the receiver outputs the range measurements to closed-form position estimator 130.

Closed-form position estimator 130, which includes one or more processors 132 and programmed memory modules or software 134, processes the range measurements using a closed-form, that is, non-iterative or deterministic, algorithm to determine a position solution, or estimate. In some embodiments, estimator 130 outputs the position solution to a display or control device; however, in the exemplary embodiment, estimator 130 outputs the position solution as well as the range measurements to iterative position estimator 140.

Iterative position estimator 140 comprises one or more processors 142 and programmed memory modules 144. (Although the exemplary embodiment shows estimators 130 and 140 as comprising separate processors, other embodiments use one processor for both estimators.) Estimator 140 uses the closed-form position solution from estimator 130 as an initial position estimate in an iterative position-estimation algorithm for solving the non-linear pseudorange equations.

In the exemplary embodiment, this entails linearizing a set of pseudorange or range equations around the closed-form position estimate. An exemplary linearization procedure entails determining a set of estimated range measurements that would yield the initial position solution and subtracting these estimated range measurements from the actual range measurements. Once linearization is complete, the iterative position estimator proceeds to determine another position estimate using the linearized range measurements within a least-squares estimation procedure, such as Kalman filtering or extended Kalman filtering. This position estimate is output to a device, such as vehicle control system 150.

Vehicle control system 150 receives the position estimate, compares it to a desired position, determines if vehicle control adjustments are necessary, and actuates one or more vehicle controls as necessary to adjust vehicle position or heading. In some embodiments, vehicle control system is an aircraft or spacecraft flight-management system.

First Exemplary Closed-Form Method of Estimating Position

FIG. 2 shows a flowchart 200 which illustrates further details of operating system 100, particularly details of operating closed-form position estimator 130. Specifically, flowchart 200, which includes process blocks 202–208, depicts a first exemplary method of computing a non-iterative, or deterministic, solution for the following m pseudorange equations:

$$(x_i - x_0)'(x_i - x_0) = c^2(t_i - t_0)^2, \; i=1, \ldots m \quad (1)$$

where subscript i is an index ranging from I to m (the number of range measurements); $x_i \in R^n$ denotes the n-element known position vector of the i-th transmitter; $x_0 \in R^n$ denotes the unknown position of the receiver; and $(\;)'$ denotes vector or matrix transposition; n denotes the dimension of the position vectors. When altitude is known, n is 2, and when altitude is unknown, n is 3. (In the exemplary embodiment, m is greater than or equal to n+1.) Additionally, c denotes the speed of light; $t_i$ denotes the known time that the $i^{th}$ transmitter transmits its signal; and $t_0$ denotes the unknown time (not known to the needed precision) at which the receiver receives the signals from all the transmitters. In typical applications, the signals from each transmitter may not be received at the same time. However, the positions of the transmitters, for example in the form of ephemeris or orbit data, are known, and the exemplary embodiment mathematically shifts them back to the point where they would have to be for their signals to arrive at the receiver at the same time. (Embodiments with knowledge of to generally use one less range measurement.)

At block 202, the exemplary method begins by expressing the m pseudorange equations in equation (1) more advantageously as a series of intersecting cones, each centered at $(Z_i, t_i)$, or as:

$$(z_i - z_0)' S (z_i - z_0) = 0 \; i=1, \ldots, m \quad (2)$$

where $z_i \in R^{n+1}$ for i=1 to m denotes the combined position and time vector for the transmitters and $z_0 \in R^{n+1}$ denotes the same for the receiver. More succinctly, this is expressed as $$z_i = \begin{bmatrix} x_i \\ ct_i \end{bmatrix} \; i = 0, 1, 2, \ldots, m \quad (3)$$

S is defined as $$S = \begin{bmatrix} I_n & 0 \\ 0 & -1 \end{bmatrix} \in R^{(n+1) \times (n+1)} \quad (4)$$

where $I_n$ is the n×n identity matrix.

In equation (2), the unknown $z_0$ lies at an intersection of the m cones. Notably, equation (2) shows that each of the m pseudorange equations is quadratic in the unknown vector $Z_0$. When there are more equations than unknowns, the unique solution for $z_0$ always lies on the half cone that has $t_0 > t_i$ since the receiver must receive the signal after it is sent. When there are as many equations as unknowns, there are two solutions. One of the solutions will lie on the half cone with $t_0 > t_i$. If the second solution lies on the other half cone with $t_0 < t_i$, then that second solution has to be discarded. With definition of the equation at (2), Execution of the exemplary method proceeds to block 204.

Block 204 derives a set of m−1 linear equations from the m quadratic equations defined in (2). In the exemplary embodiment, this entails selecting one equation, for example, the $m^{th}$ equation and then subtracting each of the m−1 other equations from it to determine m−1 equations which are linear in $z_0$. These m−1 equations are defined as $$0 = (z_i - z_0)' S (z_i - z_0) - (z_m - z_0)' S (z_m - z_0) = (z_i' S z_i - z_m' S z_m) - 2(z_i - z_m)' S z_0 \quad (5)$$

Rearranging equation (5) yields $$(z_i - z_m)' S z_0 = \frac{1}{2}(z_i' S z_i - z_m' S z_m) \quad (6)$$

which can be further manipulated to obtain $$(z_i - z_m)' S (z_0 - z_m) = \frac{1}{2}(z_i - z_m)' S (z_i - z_m) \quad (7)$$

Equation (7) can be rewritten in the form $$M' S (z_0 - z_m) = w \quad (8)$$

where matrix M is defined as $$M=[z_1-z_m, z_2-z_m, \ldots, z_{m-1}-z_m] \in R^{(n+1)\times(m-1)} \quad (9)$$

and vector w is defined as $$w = \frac{1}{2}\begin{bmatrix} (z_1-z_m)'S(z_1-z_m) \\ (z_2-z_m)'S(z_2-z_m) \\ \vdots \\ (z_{m-1}-z_m)'S(z_{m-1}-z_m) \end{bmatrix} \quad (10)$$

The matrix M and vector w both are known quantities based on the measurement data. The exemplary embodiment selects m to be a transmitter near the center of visible sky or visible region to avoid or mitigate errors stemming from transmitter geometry. Thus, with this choice, equations based on a low-quality range measurement for a poorly positioned transmitter will not pollute or corrupt the equations based on range measurements from better positioned satellites. After defining this set of linear equations execution continues at block 206.

Block 206 entails solving the system of m−1 linear equations in (8). Although there are a number of methods for solving these equations, the exemplary embodiment determines a least-squares solution according to $$z_0 = z_m + (SM\ M'S)^{-1}SMw = z_m + S(M\ M')^{-1}Mw \quad (11)$$

Notably, equation (11) expresses a complete and unique linear-algebraic solution to the range equations for cases where redundant range measurements are available.

In block 208, this position estimate is forwarded to iterative position estimator 140 for use an initial position solution in a Kalman filtering algorithm.

Second Exemplary Closed-Form Method of Estimating Position

FIG. 3 shows a flowchart 300 which. illustrates a second exemplary method for computing a non-iterative or deterministic solution for the pseudorange equations given at equation (2). Flowchart 300 includes process blocks 302–310. For convenience equation (2), which expresses the m quadratic pseudorange equations as a set of intersecting cones, each centered at $(x_i, t_i)$ is repeated here as equation (12):

$$(z_i-z_0)'S(z_i-z_0)=0 \quad i=1,\ldots,m \quad (12)$$

The method begins at block 302, which entails using range measurements from receiver 120 to define a matrix N. In the exemplary embodiment, the N matrix definition stems from expressing the m−1 equations in (12) in the scaled form of $$N_v = 0 \in R^m \quad (13)$$

where matrix N is defined as $$N = \begin{bmatrix} r^2 & -2z_1'Sr & z_1'Sz_1 \\ r^2 & -2z_2'Sr & z_2'Sz_2 \\ \vdots & \vdots & \vdots \\ r^2 & -2z_m'Sr & z_m'Sz_m \end{bmatrix} \in R^{m\times(n+3)}, \quad (14)$$

and vector v is defined as $$v = \begin{bmatrix} z_0'Sz_0 \\ z_0 r \\ r^2 \end{bmatrix} \in R^{n+3} \quad (15)$$

In both equations (14) and (15), r denotes a fixed scalar having a magnitude approximately equal to the average or typical distance between transmitters. The fixed scalar is used to make all the entries in the N matrix approximately the same magnitude, and thus to ensure better numerical conditioning in subsequent portions of the exemplary method. Once matrix N has been defined execution proceeds to block 304.

Block 304 entails determining the v vector, which from inspection includes a scaled version of the desired position solution, from matrix N. The exemplary method determines the v vector using the kernel of matrix N. This determination relies on the insight that for noiseless measurements, the right kernel of matrix N includes terms that match the v vector. So, with noisy measurements, the exemplary embodiment determines a v vector that gives the smallest error, N * v. This entails equating v to the right singular vector of matrix N corresponding to the smallest singular value of N. The length of a numerically computed kernel vector v is arbitrarily set to 1. After determination of the vector, execution continues on one of two exemplary paths depending on whether one desires an optimal or non-optimal closed-form solution based on the v-vector.

Block 306 entails determining a non-optimal closed-form position solution from the v vector. The exemplary embodiment recognizes that the v vector includes a scaled version of the position solution and thus attempts to re-scale the v vector to match the ideal, that is, noiseless, v vector definition in equation (15). Although there are a number of ways to re-scale this vector, the exemplary method scales the length of the computed vector v so that its bottom element is $r^2$. This can be done by taking the unit vector in the v direction (from the svd (singular value decomposition)), re-scaling it so that element (n+3) has a magnitude of $r^2$, and then dividing elements (2) through (n+2) by r. Following this procedure yields the position solution as $$z_0 = \frac{r}{v_{n+3}}(v_2, v_3, \ldots, v_{n+2}). \quad (16)$$

Thus, this non-optimal solution essentially computes the position solution using all but the first element of the v vector, $z_0'Sz_0$. This means that the constraints on the elements of the v vector are not precisely met and that the solution in equation (16) is not optimal in the sense of having a minimum error. To minimize error in the solution, one can use the exemplary procedure outlined below for block 308.

Block 308 entails determining an optimal position solution based on the computed v vector. In the exemplary embodiment, this entails executing process blocks 308a, 308b, and 308c.

Block 308a defines a norm that minimizes the error in all elements of v and then computes the optimal solution based on this norm. There are a number of ways to define the norm. For example, one could minimize the quartic polynomial $$\min_{z_0}\|v-(z_0'Sz_0,z_0r,r^2)'\|^2. \quad (17)$$

However, this minimization would require setting the derivative of this quartic polynomial to zero, and solving a system of n+1 cubic polynomials in the n+1 elements of $z_0$. Such a system of polynomials typically has multiple zeros, meaning there could be multiple local minima to the quartic function. To avoid this local minima problem, the exemplary embodiment defines a different norm, a norm having the property that it is zero when the range measurements are noiseless, that is non-negative, and that has a single local minimum.

More particularly, the exemplary embodiment constructs the norm, using the following procedure. A part step in this procedure entails defining a P matrix using terms of the v vector. In defining the P matrix, the exemplary embodiment recognizes that the ideal, that is, noiseless v vector, adheres to the following constraint:

$$v_1 v_{n+3} - \|(v_2, v_3, \ldots, v_{n+1})\|^2 v_{n+2} v_{n+2} \quad (18)$$

Moreover, this constraint equates to the zero-valued determinant of the following 2×2 matrix P:

$$P = \begin{bmatrix} v_1 r^2 & [\|(v_2, v_3, \ldots, v_{n+1})\| - v_{n+2}]r \\ [\|(v_2, v_3, \ldots, v_{n+1})\| + v_{n+2}]r & v_{n+3} \end{bmatrix} \quad (19)$$

The determinant of matrix P is zero for noiseless measurements, because P has the form of the following rank 1 matrix $P_{(no\ noise)}$ $$P_{(no\ noise)} = \begin{bmatrix} \|(v_2, v_3, \ldots, v_{n+1})\| - v_{n+2} \\ r \end{bmatrix} \quad (20)$$

$$[\|(v_2, v_3, \ldots, v_{n+1})\| + v_{n+2}, r]$$

Correspondence in the terms of equations (19) and (20) can be verified using equation (15) and (18). From equation (15), which defines the vector v, it follows for noiseless measurements that $$(v_2, v_3, \ldots, v_{n+1}) = x_0 r \quad (21)$$

and $$v_{n+2} = c t_0 r. \quad (22)$$

Substituting equations (21) and (22) into equation (20) yields $$P_{(no\ noise)} = \begin{bmatrix} \|x_0\| - c t_0 \\ r \end{bmatrix} [\|x_0\| + c t_0, r] \quad (23)$$

With this recognition, the exemplary embodiment proceeds to approximate matrix P in equation (19) using noisy measurements. More particularly, this entails calculating a rank 1 approximation for matrix P using a singular-value decomposition (SVD) of matrix P, and then dropping the second singular value of P. The singular-value decomposition of matrix P is given as $$P = U \Sigma V', \quad (24)$$

where $$\Sigma = \text{diag}((\sigma_1, \sigma_2)) \quad (25)$$

$$U'U = I_2 = V'V \quad (26)$$

With the P matrix defined based on the v vector, the exemplary embodiment defines the norm based on the matrix P and a rank 1 matrix $\hat{P}$ that is closest to the P matrix, or in other words, minimizes the matrix norm of $P - \hat{P}$. Mathematically, this is expressed as $$\min_{rank(\hat{P})=1} \|P - \hat{P}\| = \sigma_2(P) \geq 0 \quad (27)$$

In block 308b, after defining the norm, the exemplary method computes the vector v that minimizes the norm. Since matrix $\hat{P}$ includes the terms of the optimum v vector, this entails computing the unique optimum value of matrix $\hat{P}$ according to:

$$\hat{P} = U_1 \sigma_1 V_1' \quad (28)$$

where $U_1$ is the first column of U and $V_1$ is the first column of V. When $\sigma_1 \neq \sigma_2$, this solution is unique, since then the singular value decomposition is unique (up to simultaneous sign flips on columns of U and V).

Then, as block 308c shows, the exemplary method uses the unique optimum value of matrix $\hat{P}$ to determine an optimal solution for $z_0$. More particularly, this entails setting $P_{(no\ noise)} = P$ to obtain $$\begin{bmatrix} \|x_0\| - c t_0 \\ r \end{bmatrix} = [r/U_1(2)]U_1 \quad (29)$$

$$[\|x_0\| + c t_0, r] = [r/V_1(2)]V_1' \quad (30)$$

Subsequently, the exemplary embodiment solves for $\|x_0\|$ and $c t_0$. This entails equating the corresponding components in equation (29) and (30) to obtain expressions for $\|x_0\| - c t_0$ and $\|x_0\| + c t_0$. Adding the resulting expressions for $\|x_0\| - c t_1$ and $\|x_0\| + c t_0$ produces $2\|x_0\|$, and subtracting these expressions produces 2cto, enabling one to determine $\|x_0\|$ and cto. After determining $\|x_0\|$ and $c t_0$, the exemplary embodiment computes $z_0$ using the following expression to compute $x_0$ from its length and the components of the v vector:

$$x_0 = \|x_0\| * \frac{(v_2, v_3, \ldots, v_{n+1})}{\|(v_2, v_3, \ldots, v_{n+1})\|} \quad (31)$$

Thus, equation (31) provides the value of $x_0$ that minimizes the error $$\min_{rank(\hat{P})=1} \|P - \hat{P}\| \quad (32)$$

In block 310, this solution $x_0$ and $c t_0$ are forwarded to iterative position estimator 140 for use an initial position solution in a Kalman filtering or other type of iterative algorithm.

Use of Exemplary Methods in Distributed Robotics Applications

Embodiments of the present invention are applicable to distributed robotic system. In these systems, the transmitters of transmitter system 110 and receiver 120 are components of transceivers mounted to respective system robots. In general operation, m robots, called rangers, have known positions $x_i$, and at least one robot, called a scout, has an unknown position $x_0$. One ranger sends out a pulse to a scout and all other rangers. After an unknown time delay, dt, the scout responds, sending a response pulse to ranger 1 as well as the other rangers. Each ranger has its own clock and computes a time difference based on the pulse transmission time and the time it received the response pulse. The ranger clocks are not synchronized. The rangers then compute the unknown position of the scout using one of the exemplary methods described above.

Use of the exemplary methods, however, entails converting the robotic range measurements to fit the ($x_i$, $ct_i$) i=1, 2, ..., m, form used in the exemplary methods of FIGS. 2 and 3 to compute ($x_0$,$ct_0$). More specifically, this entails defining a range $L_i$ between each ranger and the scout as $$L_i = \|x_i - x_1\| \tag{33}$$

and a range $R_i$ between the first, or primary ranger, and the each i-th ranger as $$R_i = \|x_1 - x_1\| i = 2, \ldots, m. \tag{34}$$

The exemplary method then calculates $t_i$, i=1, 2, ..., m for each of the rangers. For the primary ranger, designated ranger 1, the signal receipt time $t_1$, that is the time ranger 1 received the response signal from the scout, is define as the total time delay between sending the pulse to the scout and receiving the response pulse from the scout. Mathematically, this is expressed as $$t_1 = t_{response\ at\ 1\ from\ scout} - t_{send\ from\ 1} = 2*L_1/c + dt \tag{35}$$

For the other rangers 2 through m, ranger 1 calculates signal receipt times $t_i$, i=2,m from $$t_1 = t_{response\ at\ i\ from\ scout} - t_{receive\ from\ 1} + R_i/c = (L_1 + L_i)/c + dt \tag{36}$$

In arriving at this result, the exemplary method defines $t_{response\ at\ i\ from\ scout} - t_{receive\ from\ 1}$, the delay between receipt of the pulse from ranger 1 and the receipt of the response from the scout, as $$t_{response\ at\ i\ from\ scout} - t_{receive\ from\ 1} = (L_1 + L_i - R_i)/c + dt \tag{37}$$

Once these times have been computed, the unknown position of the scout is computed using one or more of the exemplary methods described in FIGS. 2 and 3.

An alternative send-and-response scenario gives rise to another method of converting robotic range measurements to fit the exemplary methods of FIGS. 2 and 3. In this scenario, each ranger sends out a pulse and listens for a reply from the scout. The delay dt does not change rapidly, so for one range computation, each ranger can assume the scout had the same dt and compute $$ti = (t\_response\_at\_i\_from\_scout\_t\_receive\_from i)/2 = Li/c + dt/$$
$$2\bar{t} = (t_{response\ at\ i\ from\ scout} - t_{receive\ from\ 1})/2 = (L_i)/c + dt/2 \tag{38}$$

Compute the times according to equation (36) gives each ranger the same time bias of dt/2.

Conclusion

In furtherance of the art, the inventors have presented new methods as well as systems and software embodying these methods, for using range measurements to estimate position. One exemplary non-iterative method entails receiving a set of m range measurements, including redundant measurements, defining a set of m non-linear range equations based on the range measurements, deriving a set of m−1 linear range equations from the m non-linear equations, and then solving the m−1 range equations using linear algebraic techniques. Another non-iterative method entails receiving a set of two or more range measurements; defining an error function based on the set of range measurements, with the error function having only one local minimum; and then determining a position estimate based the one local minimum of the error function. These and other exemplary methods based on the teachings of the present invention are expected to reduce the time necessary to compute position solutions in numerous position-measurement applications.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A non-iterative method of estimating position based on range measurements, the method comprising:

receiving a set of two or more range measurements;

defining an error function based on the set of range measurements, with the error function having only one local minimum and a predetermined value for noiseless range measurements; and determining a position estimate based on the one local minimum of the error function.

2. The method of claim 1, further comprising:

determining another position estimate based on the position estimate.

3. The method of claim 1, wherein the range measurements are received by a receiver outside a transmitter system.

4. The method of claim 1, wherein the range measurement are received by a receiver in a cellular telephone.

5. The method of claim 1, wherein the range measurements are received by ranger robot in a distributed robotics system.

6. The method of claim 1, wherein the set of range measurements includes one or more redundant range measurements.

7. The method of claim 1, wherein the predetermined value is zero.

8. The method of claim 1, wherein the error function is non-negative.

9. In a position-measurement system having at least one receiver and two or more transmitters, a method of computing a position estimate for the receiver from a set of two or more range measurements, the method comprising:

defining a matrix based on the range measurements;

defining a vector v as the kernel of the matrix, with the vector v having a last element;

defining a P matrix based on the vector v;

computing a rank-1 matrix $\hat{P}$ that minimizes a norm $\|P - \hat{P}\|$; and computing the position estimate based on the rank-1 matrix $\hat{P}$.

10. The method of claim 9, wherein the set of range measurements includes one or more redundant range measurements.

11. A system comprising:

means for receiving a set of two or more range measurements;

means for defining an error function based on the set of range measurements, with the error function having only one local minimum; and means for determining a position estimate based on the one local minimum of the error function.

12. The system of claim 11, further comprising:

means for determining another position estimate based on the position estimate.

13. The system of claim 11, wherein the predetermined value is zero.

14. The system of claim 11, wherein the error function is non-negative.

15. A position-measurement system comprising:
means for defining a matrix based on a set of two or more range measurements;
means for defining a vector v as the kernel of the matrix, with the vector v having a last element;
means for defining a P matrix based on the vector v;
means for computing a rank-1 matrix $\hat{P}$ that minimizes a norm $\|P-\hat{P}\|$; and
means for computing the position estimate based on the rank-1 matrix $\hat{P}$.

16. A machine-readable medium comprising:
code segments for defining an error function based on a set of range measurements, with the error function having only one local minimum and a predetermined value for noiseless range measurements; and
code segments for determining a position estimate based the one local minimum of the error function.

17. The medium of claim 16, wherein the predetermined value is zero.

18. The medium of claim 16, wherein the error function is non-negative.

19. A machine-readable medium for use in a position-measurement system, the medium comprising:
code segments for defining a matrix based on a set of range measurements;
code segments for defining a vector v as the kernel of the matrix;
code segments for defining a P matrix based on the vector v;
code segments for initiating computation of a rank-1 matrix $\hat{P}$ that minimizes a norm $\|P-\hat{P}\|$; and
code segments for initiating computation of a position estimate based on the rank-1 matrix $\hat{P}$.

20. A non-iterative method of estimating position based on range measurements, the method comprising:
defining a set of m non-linear range equations based on the range measurements;
defining a set of m−1 linear range equations based on the m non-linear range equations; and
fully determining a position solution from the set of m−1 linear range equations.

21. The method of claim 20, wherein defining a set of m−1 linear range equations based on the m non-linear range equations comprises:
selecting one of the set of m non-linear equations; and
subtracting each of the other of the non-linear equations from the one selected equation.

22. The method of claim 20, further comprising:
computing another position solution based on the position solution.

23. The method of claim 20, wherein the m non-linear equations include at least one equation based on redundant range measurements.

24. A system comprising:
means for defining a set of m non-linear range equations based on the range measurements;
means for defining a set of m−1 linear range equations based on the m non-linear range equations; and
means for fully determining a position solution from the set of m−1 linear range equations.

25. A machine-readable medium comprising:
code segments for defining a set of m non-linear range equations based on the range measurements;
code segments for defining a set of m−1 linear range equations based on the m non-linear range equations; and
code segments for fully determining a position solution from the set of m−1 linear range equations.

26. The machine-readable medium of claim 25, wherein the medium is an electronic, magnetic, or optical storage or communication medium.

27. A system comprising:
a receiver for receiving signals from a set of transmitters and for outputting a set of range measurements based on the signals; and
a closed-form position estimator responsive to the range measurements to output a position solution based on the range measurements, wherein the closed-form position estimator comprises:
means for defining a set of m non-linear range equations based on the range measurements;
means for defining a set of m−1 linear range equations based on the m non-linear range equations; and
means for fully determining a position solution from the set of m−1 linear range equations.

28. The system of claim 27 further comprising:
an iterative position estimator responsive to the position solution to output a different position solution based on the position solution.

29. A system comprising:
a receiver for receiving signals from a set of transmitters and for outputting a set of range measurements based on the signals; and
a closed-form position estimator responsive to the range measurements to output a position solution based on the range measurements, wherein the closed-form position estimator comprises:
means for defining an error fuinction based on the set of range measurements, with the error function having only one local minimum and a predetermined value for noiseless range measurements; and
means for determining a position estimate based on the one local minimum of the error function.

30. The system of claim 29, wherein the predetermined value is zero.

31. The system of claim 29, wherein the error function is non-negative.

* * * * *